United States Patent [19]

Kovacs et al.

[11] Patent Number: 5,299,523
[45] Date of Patent: Apr. 5, 1994

[54] AMPHIBIOUS LAND RECLAMATION VEHICLE

[75] Inventors: Mihaly Kovacs; Peter Kovacs; Endro Kovacs, all of Plant City, Fla.

[73] Assignee: Kempco, Inc., Ft. Meade, Fla.

[21] Appl. No.: 986,961

[22] Filed: Dec. 8, 1992

[51] Int. Cl.⁵ .............................................. B63B 38/00
[52] U.S. Cl. ..................................... 114/270; 180/7.1; 440/100
[58] Field of Search ................. 440/100; 114/270; 180/7.1, 242

[56] References Cited

U.S. PATENT DOCUMENTS

| | | | |
|---|---|---|---|
| 2,488,310 | 11/1949 | Mayer | 440/100 |
| 2,998,996 | 9/1961 | Aghnides | 301/41 |
| 3,001,601 | 9/1961 | Aghnides | 180/75 |
| 3,014,547 | 12/1961 | Van Der Lely | 180/75 |
| 3,212,594 | 10/1965 | Scott | 180/7 |
| 3,765,466 | 10/1973 | Tsuruta | 152/210 |
| 4,353,428 | 10/1982 | Kovar et al. | 180/7.1 |
| 4,519,466 | 5/1985 | Shiraishi | 180/7.1 |
| 5,020,627 | 6/1991 | Wittke | 180/242 X |

FOREIGN PATENT DOCUMENTS

A18533  7/1956  Fed. Rep. of Germany .
514711   4/1920  France .

*Primary Examiner*—Sherman Basinger
*Attorney, Agent, or Firm*—Dowell & Dowell

[57] ABSTRACT

A lightweight floatable vehicle which includes an articulated main frame to which a variety of earthworking and dredging equipment may be mounted and which is supported and propelled by four independently powered, hollow, generally circular pods which are positioned below the main frame. The pods are adjustably mounted to outriggers from the main frame so that the surface contact area of the pods may be altered to adjust the buoyancy, traction and weight distribution of the vehicle. A plurality of cleats are provided along the lower and outer Surfaces of each pod for purposes of providing traction and propulsion.

17 Claims, 3 Drawing Sheets

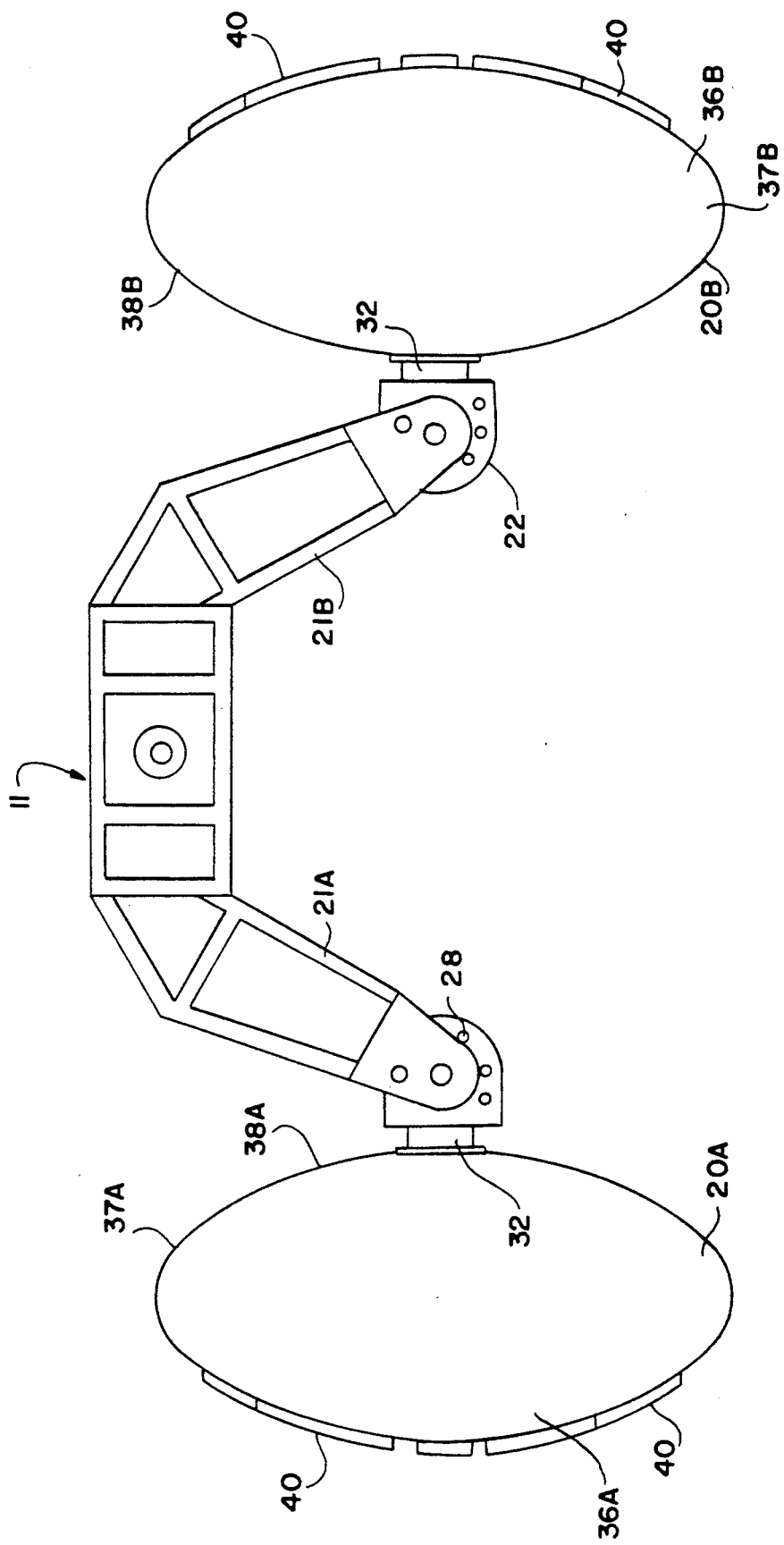

AMPHIBIOUS LAND RECLAMATION VEHICLE

BACKGROUND OF THE INVENTION

1. Field of the Invention

This invention is generally directed to amphibious vehicles utilized in land reclamation and, more specifically, to a floatable lightweight vehicle which is supported and propelled by four independently driven generally hollow pods which are of sufficient size to provide the necessary buoyancy to allow the vehicle to float on water. Each of the pods includes a generally convex lower surface. A plurality of generally radially extending fins or cleats are disposed along the outer and lower surfaces of the pods for purposes of increasing traction and providing propulsion as the pods are rotated. The pods are adjustably mounted to outriggers which extend from a main frame so that the angle of inclination of the pods relative to a surface being traversed may be selectively adjusted to thereby vary the effective surface contact area of each pod. In the preferred embodiment, the pods are driven in opposite directions with respect to one another on opposite sides of the vehicle frame and in such a manner that the pods oriented diagonally with respect to the main frame are driven in the same direction.

2. History of the Related Art

In order to preserve the environment, it is necessary in areas where strip mining activities have occurred to reclaim the land by reworking and converting it back to its natural state, or an accepted alternative state, such as for recreational uses or wildlife sanctuaries. In the strip mining of phosphate and similar resources, the ore is conventionally mixed with water and pumped to processing plants where the ore is washed and graded before being further processed to remove the phosphate from the soil. During such processing, the water is conventionally discharged as a water/clay mixture into large settling ponds where the water is allowed to slowly seep into the soil. Settling ponds often embody vast acres of land which are bordered by dikes to retain the water/clay mixture and are generally capable of retaining multiple millions of gallons of water and discharged clay per day. As the ponds fill with clay, they are generally abandoned in favor of new ponds. Once abandoned, settling ponds must be reclaimed in order to preserve the environment by draining surface waters to allow the clay to settle and dry so that the earth may be reworked utilizing conventional equipment. In other mired areas, the surface contours must be reshaped and properly seeded to restore the land to its natural state. In some instances, marshy areas must be reestablished for wildlife refuge.

The use of conventional tractors and other related vehicles to reclaim settling ponds and other areas where strip mining has occurred has not proven to be satisfactory. Because such areas are unstable and incapable of supporting the weight of conventional vehicles, such vehicles become quickly bogged down in sand, slime and mud. In order to permit dredging, backhoe and other related earthworking equipment to be utilized in areas which include standing water and often are marshy or swamp-like, various types of off-road vehicles have been designed to permit some degree of vehicle operation. Some vehicle have large hollow tires to distribute the weight of a vehicle over a greater area of unstable soil or to provide some degree of buoyancy for the vehicle in areas where there is standing water or a high water table. Unfortunately, in some areas, it has been found that such vehicles are not satisfactory and they often become bogged down requiring that they be towed from the reclamation site. In addition, the maneuverability of such vehicles in terrains of poor ground stability is limited and, thus, not all areas of a site being reclaimed are accessible.

Other types of reclamation vehicles incorporate pontoons to provide increased buoyancy. This type of equipment is generally preferred in areas where there is standing water which is sufficiently deep to allow the vehicle to float, however, such units become bogged down in areas where there is a substantial amount of clay and limited surface water. Again, as with the oversized tire reclamation vehicles, pontoon type vehicles are restricted in their maneuverability in many types of soil conditions encountered in most land reclamation projects.

SUMMARY OF THE INVENTION

This invention is directed to an amphibious land reclamation vehicle which includes a main frame from which various types of earthworking equipment may be mounted and which frame is buoyantly supported and propelled by the use of four independently powered drive pods which are connected to the main frame by outriggers which insure that the pods are generally oriented below the lower surface of the main frame. Each of the drive pods is connected to its outrigger so that the angle of inclination of the pod may be selectively adjusted. Each pod is further independently driven in rotation by an appropriate motor which is drivingly connected thereto. Each pod is hollow and includes a generally convex lower surface. By selectively adjusting the angle of each of the pods, the proportion of their lower surfaces which contact a surface over which the vehicle is operating may be varied thereby effectively adjusting the amount of traction and buoyancy obtained and also allowing for alterations in vehicle load distribution over such surfaces.

A plurality of generally radially inwardly extending propulsion fins or cleats are provided along a portion of the lower surface of each of the pods. The cleats are utilized to propel the vehicle through water And to provide traction in marshy or muddy surface areas. In some embodiments, cutting blades or elements are mounted to extend outwardly from the periphery of each pod and which are useful when the vehicle is utilized in marshy areas wherein tall grass and weeds are encountered.

In the preferred embodiment, the main vehicle frame includes front and rear sections which are rotatably articulated with respect to one another. The pods mounted to one of the sections are mounted so that their rotational axes extend downwardly and inwardly relative to one another while the pods mounted to the other section are mounted so that their rotational axes are oriented downwardly and outwardly relative to one another. In addition, the pods on opposite sides of the sections are driven in opposite directions with respect to one another with the pods positioned diagonally across the main frame being driven in the same rotational direction.

It is a primary object of the present invention to provide an amphibious land reclamation vehicle wherein the main frame of the vehicle is elevated with respect to any surface over which the vehicle is operated so that the frame cannot become bogged down in marshy or muddy areas and so that the vehicle may be maneuvered throughout all types of land reclamation sites including areas of standing water, areas of marshy, swamp-like consistency, or areas having hardened, encrusted surfaces.

It is another object of the present invention to provide an amphibious land reclamation vehicle to which various earthworking implements and/or pumps may be mounted and which utilizes four independently driven pods to provide buoyancy and maximum maneuverability of the vehicle regardless of surface conditions and wherein the degree of buoyancy or stability of the vehicle may be effectively altered by changing the angle or pitch of the rotational axis of each of the drive pods.

It is another object of the present invention to provide an amphibious land reclamation vehicle which is supported and driven by four hollow drive pods wherein each of the drive pods may also include cutting elements associated therewith for facilitating the movement of the vehicle through areas of tall grass and other vegetation.

DESCRIPTION OF THE DRAWINGS

FIG. 3 is a front elevational view of the land reclamation vehicle of the present invention showing the drive pods in a secondary transport position.

DESCRIPTION OF THE PREFERRED EMBODIMENT

Figure 1:
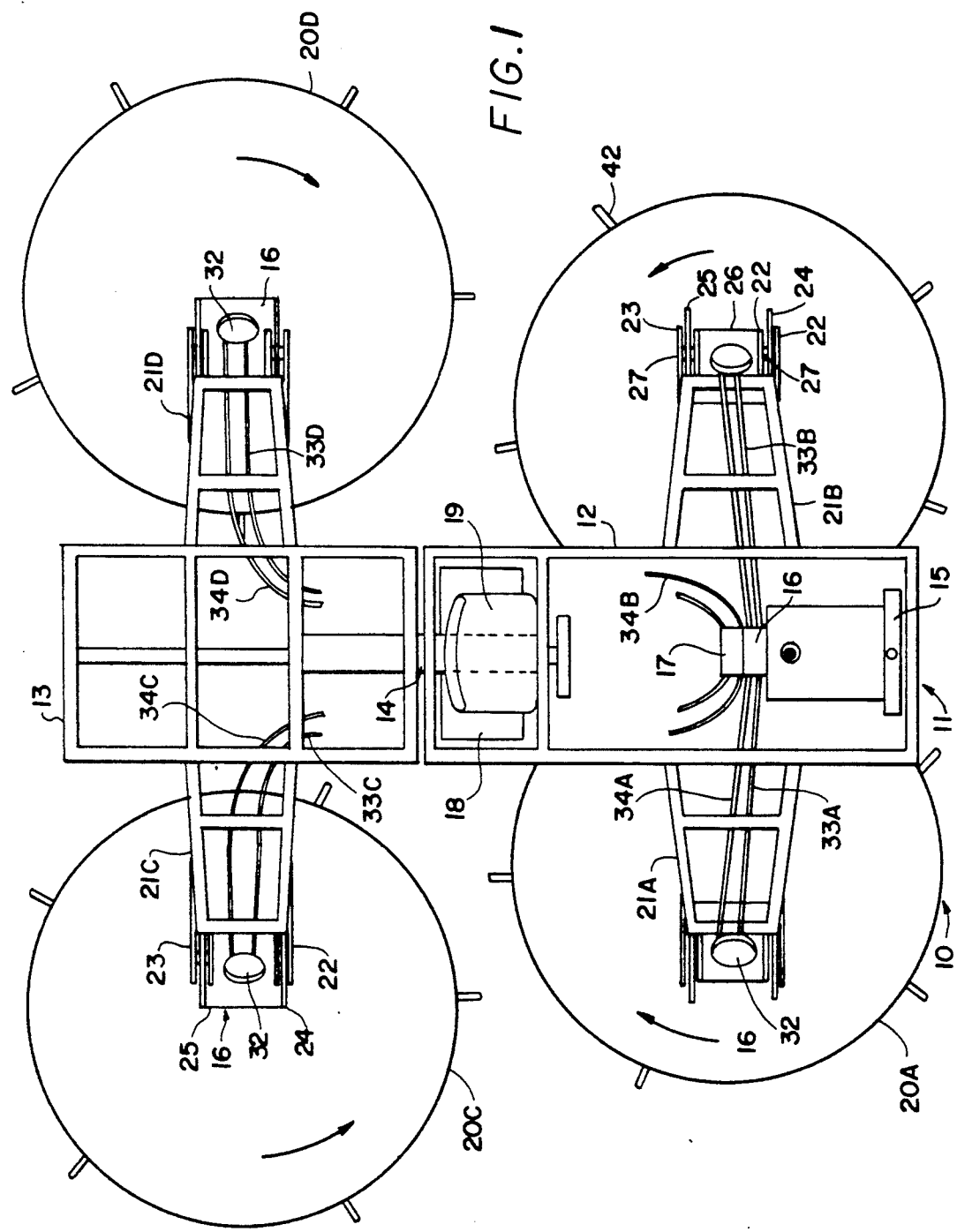
FIG. 1 is a top plan view of the land reclamation vehicle of the present invention.

With continued reference to the drawings, the lightweight amphibious vehicle 10 of the present invention is shown as including a main frame 11 having forward and rear sections 12 and 13. A pivot shaft 14 is utilized to connect the front and rear frame sections 12 and 13 so that the sections are rotatable with respect to one another to allow for uneven terrain conditions. An engine 15 is mounted to the front frame section 12. The engine is drivingly connected to a pair of variable displacement hydraulic pumps 16 and 17 which are utilized for purposes of driving hydraulic drive motors as will be discussed in greater detail hereinafter. Hydraulic fluid is supplied from a tank 18 mounted beneath the operator's seat 19.

In order to reduce the weight of the vehicle, the vehicle frame is preferably an open reinforced steel framework. The rear section 13 of the vehicle frame is generally free of obstructions so that various earthworking and dredging equipment, including pumps, may be mounted thereto. Generally, the weight of the equipment will offset the weight of the motor 15.

The frame 11 is supported by a plurality of hollow drive pods 20a-20d, each of which are mounted to the frame by way of outriggers 21a-21d. The pods are preferably constructed of aluminum to reduce weight. Each outrigger includes an outermost end portion constructed as two pairs of spaced generally parallel brackets 22 and 23 between which a pair of spaced arms 24 and 25 of motor mounting brackets 26 are pivotally mounted by means of stub shafts 27. A plurality of spaced openings 28 are made through the arms 24 which are selectively alignable with an opening 29 through the space brackets 22. A locking pin or bolt 30 is selectively oriented through the aligned openings 28 and 29 in order to retain the brackets 26 in a fixed orientation relative to the outriggers. In the embodiment shown, adjustment of the angle of the brackets is accomplished manually. It is envisioned, however, that hydraulics or gearing could be provided for automatically adjusting the angle of inclination or pitch of the mounting brackets 26 relative to the outer end portions of the outriggers.

Mounted to each of the brackets 26 is a hydraulic motor 32. Each motor is drivingly connected to one of the pods 20a-20d. The hydraulic motors 32 associated with the drive pods 20a and 20b receive hydraulic fluid from the variable displacement pump 16 by way of fluid inlet and return lines 33a and 33b, 34a and 34b. The hydraulic motors associated with the drive pods 20c and 20d receive hydraulic fluid from the variable displacement pump 17 by way of fluid conduits 33c and 33d and 34c and 34d. In practice, appropriate controls are provided for reversing the direction of the flow of fluid through the variable displacement pumps 16 and 17 so that the drive pods may be rotated in opposite directions. In addition, although only two variable displacement pumps are shown for controlling each of the front drive pods and rear drive pods, it is possible that four pumps could be utilized so that each of the pods is independently controllable.

Figure 2:
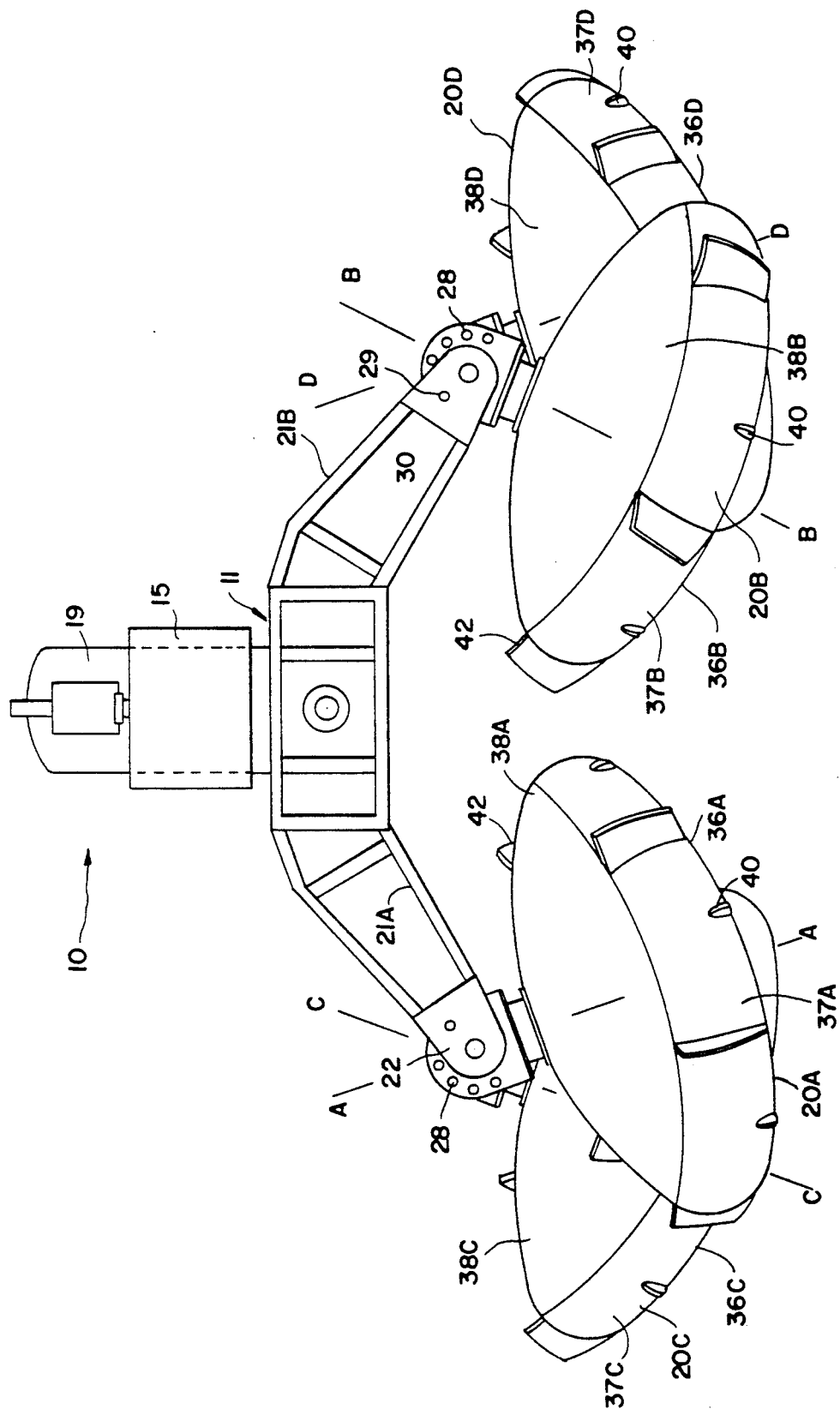
FIG. 2 is a front elevational view of the land reclamation vehicle of the present invention showing the drive pods in a normal operating position.

With specific reference to FIG. 2 of the drawings, the structure of the drive pods of the present invention will be discussed in greater detail. The drive pods are shown as being enlarged hollow structures which are generally elliptical in vertical cross section. It is important that the lower surfaces 36a-36d of each of the drive pods is generally convex and dish-shaped in configuration extending inwardly from the outer peripheral edge portions 37a-37d. In the preferred embodiment, the upper surfaces 38a-38d are generally convex, however, other configurations may be employed. It should be noted that each of the drive pods is rotatable about its central axis A—A, B—B, C—C, D—D. Each axis extends through the drive motor and the upper and lower surfaces of the drive pods. In order to maintain control and maneuverability of the vehicle, it is preferred that the axes A—A and B—B of the front drive pods be inclined downwardly and inwardly relative to one another while the axes C—C and D—D of the rear drive pods are angled downwardly and outwardly relative to one another. By way of example, as is shown in FIG. 2, the axes A—A and B—B are rotated approximately 110° with respect to the horizontal, while the axes C—C and D—D are rotated approximately 70° from the horizontal. As previously noted, however, the angle of orientation of each of the pods may be adjusted by selectively rotating the mounting brackets 26 with respect to the outer portions of each of the outrigger frames.

Due to the configuration of each of the drive pods, when it is necessary to provide increased surface contact area either for floatation purposes or for distribution of weight in marshy or muddy areas, it is only necessary to adjust the pitch or angle of the drive pods and thereafter lock the mounting brackets by utilizing the locking pins 30, as was previously discussed, thereby retaining the pods in a predetermined angular relationship.

To provide adequate propulsion for each of the drive pods, a plurality of drive fins or cleats 40 are welded or otherwise secured along the lower surface extending inwardly from the outer edges of each of the drive pods. The cleats are preferably generally radially oriented inwardly towards the rotational axis of each pod and may extend outwardly of the lower surface of the pod by two to four inches. The cleats are generally equally spaced around the surface of the pod to provide uniform displacement capacity as the pods are rotated.

As the amphibious vehicle of the present invention is designed to be operated in marshy areas, in the preferred embodiment, each of the drive pods is also provided with a plurality of cutting blades 42 which are mounted so as to extend outwardly from the outer peripheries thereof. As shown, the cutting blades 42 extend outwardly at a greater distance than the cleats 40 and are utilized to engage and cut tall marsh grass and cattails which are encountered by the vehicle. This permits the vehicle to be operated in areas where the vegetation could otherwise interfere with the rotational operation of the drive pods.

Because the amphibious vehicle of the present invention is operated in muddy and marshy areas, as well as in standing water, it is necessary that the main frame 11 of the vehicle be elevated with respect to the drive pods which supply the buoyancy for the vehicle. In this respect, the pods are normally oriented so that they are spaced entirely below the main frame of the vehicle during normal operations. However, and as shown in FIG. 3, when transporting or maneuvering the vehicle over crusted surface areas or conventional roadways, the pods may be oriented so that they track on their outer Peripheral rims 37a-37d. In some instances, this may require that the cutting blades 42 be removed from the drive pods in order not to damage the cutting blades or road surfaces. As shown in the drawing figure, when in this drive mode, the central rotational axis of each of the drive pods is generally horizontal and in this position a portion of each of the drive pods may extend slightly above the lower surface of the main vehicle frame.

It is necessary that the size of each of the drive pods be sufficient to provide adequate buoyancy for the vehicle and all of the equipment attached thereto. The dimension of the pods may vary as well as the cross-sectional configuration. It is important, however, that the lower surface 36a-36d of the drive pods be generally convex in configuration so that adjustment may be made in the available surface contact area as was previously discussed.

To provide further optimal control of the lightweight amphibious vehicle of the present invention, it is preferred that the front drive pods 36a and 36b be rotated in opposite directions with respect to one another and that the rear drive pods 36c and 36d also be rotated in opposite directions with respect to one another, such as shown by the arrows in FIG. 1. Also, the drive pods on the same side of the vehicle are rotated in opposite directions so that only the drive pods located diagonally with respect to one another across the main frame are rotated in the same direction. This type of rotational relationship of the drive pods provides stability and increased maneuverability especially in areas of poor soil stability, such as in swampy and muddy areas. In addition, as previously discussed, the direction of rotation of the drive pods may be easily reversed by simply reversing the variable displacement pumps 16 and 17.

We claim:

1. An amphibious lightweight land reclamation vehicle comprising, a main frame having first and second ends, a pair of outrigger members extending outwardly from opposite sides of and adjacent said first and second ends and having outer end portions extending below said main frame, a plurality of hollow drive pod means, means for mounting said drive pod means to said outer ends portions of said outrigger members, each of said drive pod means having upper surfaces, generally convex lower surfaces and generally circular outer peripheral portions, each of said drive pod means being rotatable about an axis extending centrally between said upper and lower surfaces thereof over a range from a first position at which said axis is substantially parallel to a travel surface to at least a second position at which said axis is substantially perpendicular to the travel surface, a plurality of cleat means extending outwardly from said lower surfaces of each of said drive pod means, a plurality of cutter elements extending outwardly from the outer peripheral portions of each of said drive pod means, said cutter elements being mounted in spaced relationship with respect to one another, means for rotating each of said drive pod means, and said drive pod means being of a size to provide sufficient buoyancy to allow the vehicle to float on water.

2. The amphibious lightweight land reclamation vehicle of claim 1 in which said means for mounting said drive pod means to said outer end portions of said outrigger members includes an adjustable bracket assembly, said means for rotating each of said drive pod means being mounted to said bracket assemblies, and means for securing said bracket assemblies in a predetermined relationship with said outer end portions of said outrigger members whereby the axis of each of said drive pod means may be variably inclined with respect to the horizontal to thereby adjust the orientation of the lower surfaces of the drive pod means with respect to a surface being traversed by the vehicle.

3. The amphibious lightweight land reclamation vehicle of claim 2 in which each of said means for rotating said drive pod means includes a hydraulic motor, and hydraulic pump means mounted to said main frame for supplying hydraulic fluid to each of said hydraulic motors.

4. The amphibious lightweight land reclamation vehicle of claim 2 in which the axis of each of said drive pod means extending from adjacent said first end of said vehicle frame are inclined downwardly and inwardly relative to one another and wherein the axis of each of said drive pod means extending from adjacent said second end of said main frame are inclined downwardly and outwardly relative to one another.

5. The amphibious lightweight land reclamation vehicle of claim 4 in which said main frame includes at least first and second sections, and means for connecting said first and second sections in pivotable relationship with respect to one another.

6. The amphibious lightweight land reclamation vehicle of claim 1 in which the axis of each of said drive pod means extending from adjacent said first end of said vehicle frame are inclined downwardly and inwardly relative to one another and wherein the axis of each of said drive pod means extending from adjacent said second end of said main frame are inclined downwardly and outwardly relative to one another.

7. The amphibious lightweight land reclamation vehicle of claim 6 in which said main frame includes at least first and second sections, and means for connecting said first and second sections in pivotable relationship with respect to one another.

8. The amphibious lightweight land reclamation vehicle of claim 1 in which said main frame includes at least first and second sections, and means for connecting said first and second sections in pivotable relationship with respect to one another.

9. An amphibious lightweight land reclamation vehicle comprising, a main frame having first and second sections, means for pivotably connecting said first and second sections to one another, a pair of outrigger members extending outwardly from opposite sides of and adjacent said first and second sections and having outer end portions extending below said main frame, a plurality of hollow drive pod means, means for adjustably mounting said drive pod means to said outer ends portions of said outrigger members, each of said drive pod means having upper surfaces, generally convex lower surfaces and generally circular outer peripheral portions, each of said drive pod means being rotatable about an axis extending centrally between said upper and lower surfaces thereof over a range from a first position at which said axis is substantially parallel to a travel surface to at least a second position at which said axis is substantially perpendicular to the travel surface, a plurality of cleat means extending outwardly from said lower surfaces of each of said drive pod means, means for rotating each of said drive pod means, and said drive pod means being of a size to provide sufficient buoyancy to allow the vehicle to float on water.

10. The amphibious lightweight land reclamation vehicle of claim 9 in which said means for adjustably mounting said drive pod means to said outer end portions of said outrigger members includes an adjustable bracket assembly, and means for securing said bracket assemblies in a predetermined relationship with said outer end portions of said outrigger members whereby the axis of each of said drive pod means may be variably inclined with respect to the horizontal to thereby adjust the orientation of the lower surfaces of the drive pod means with respect to a surface being traversed by the vehicle.

11. The amphibious lightweight land reclamation vehicle of claim 10 in which each of said drive pod means includes plurality of cutter elements extending outwardly from said peripheral portions thereof, said cutter elements being mounted in spaced relationship with respect to one another.

12. The amphibious lightweight land reclamation vehicle of claim 10 in which the axis of each of said drive pod means extending from adjacent said first end of said vehicle frame are inclined downwardly and inwardly relative to one another and wherein the axis of each of said drive pod means extending from adjacent said second end of said main frame are inclined downwardly and outwardly relative to one another.

13. The amphibious lightweight land reclamation vehicle of claim 1 in which said range is approximately 110 degrees.

14. The amphibious lightweight land reclamation vehicle of claim 9 in which said range is approximately 110 degrees.

15. An amphibious lightweight land reclamation vehicle comprising, a main frame having first and second ends, a pair of outrigger members extending outwardly from opposite sides of and adjacent said first and second ends and having outer end portions extending below said main frame, a plurality of hollow drive pod means each having upper surfaces, generally convex lower surfaces and generally circular outer peripheral portions, means for mounting said drive pod means to said outer end portions of said outrigger members, means for independently rotating each of said drive pod means, each of said drive pod means being rotatable about an axis extending centrally between said upper and lower surfaces thereof over a range from a first position at which said axis is substantially parallel to a travel surface to at least a second position at which said axis is substantially perpendicular to said travel surface, a plurality of cleat means extending outwardly from said lower surfaces of each of said drive pod means, and said drive pod means being of a size to provide sufficient buoyancy to allow the vehicle to float on water.

16. The amphibious lightweight land reclamation vehicle of claim 15 in which said means for independently rotating each of said drive pod means includes a hydraulic pump, and hydraulic pump means mounted to said main frame for supplying hydraulic fluid to each of said hydraulic motors.

17. The amphibious lightweight land reclamation vehicle of claim 15 in which said range is approximately 110 degrees.

* * * * *